Patented Apr. 23, 1946

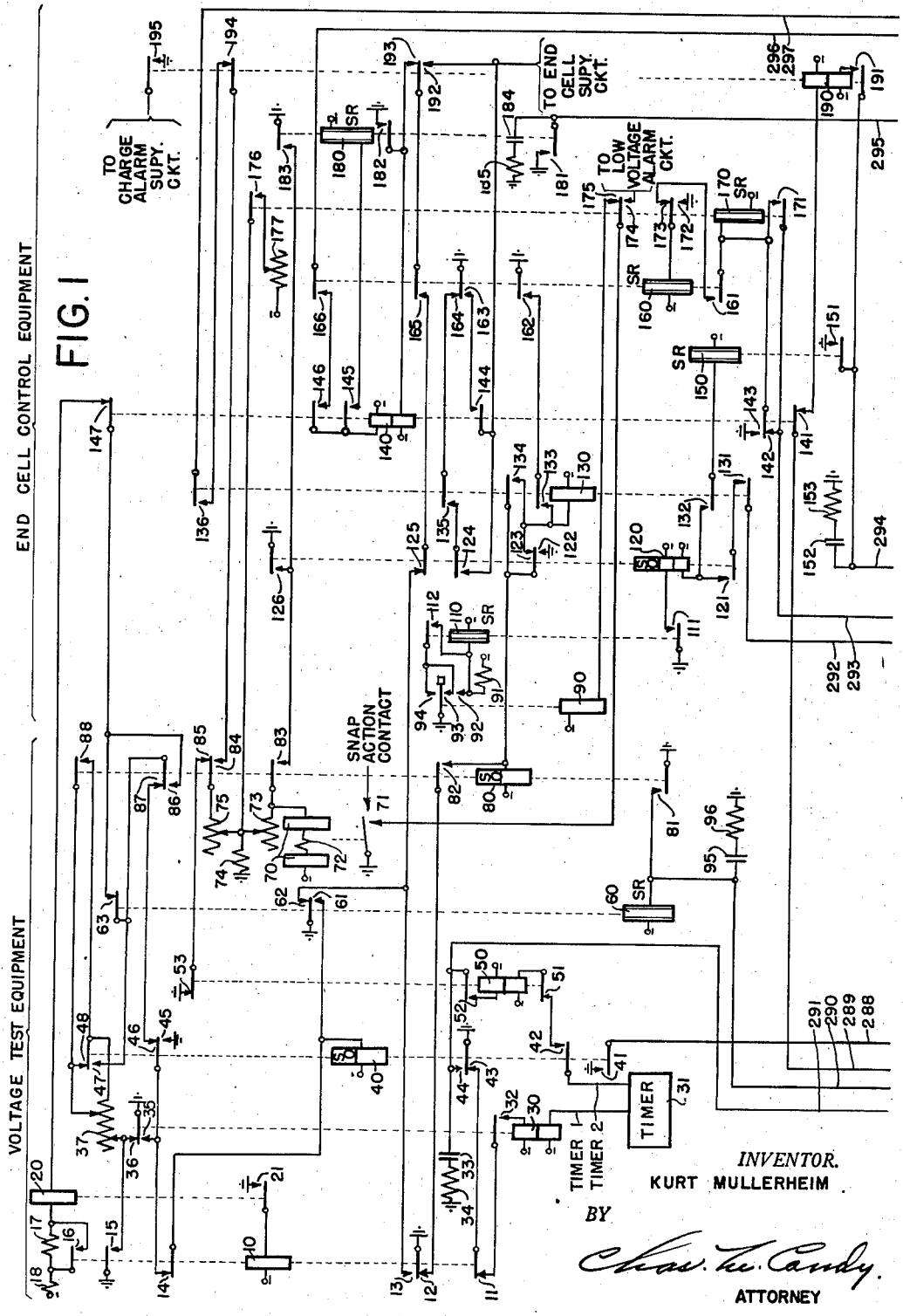

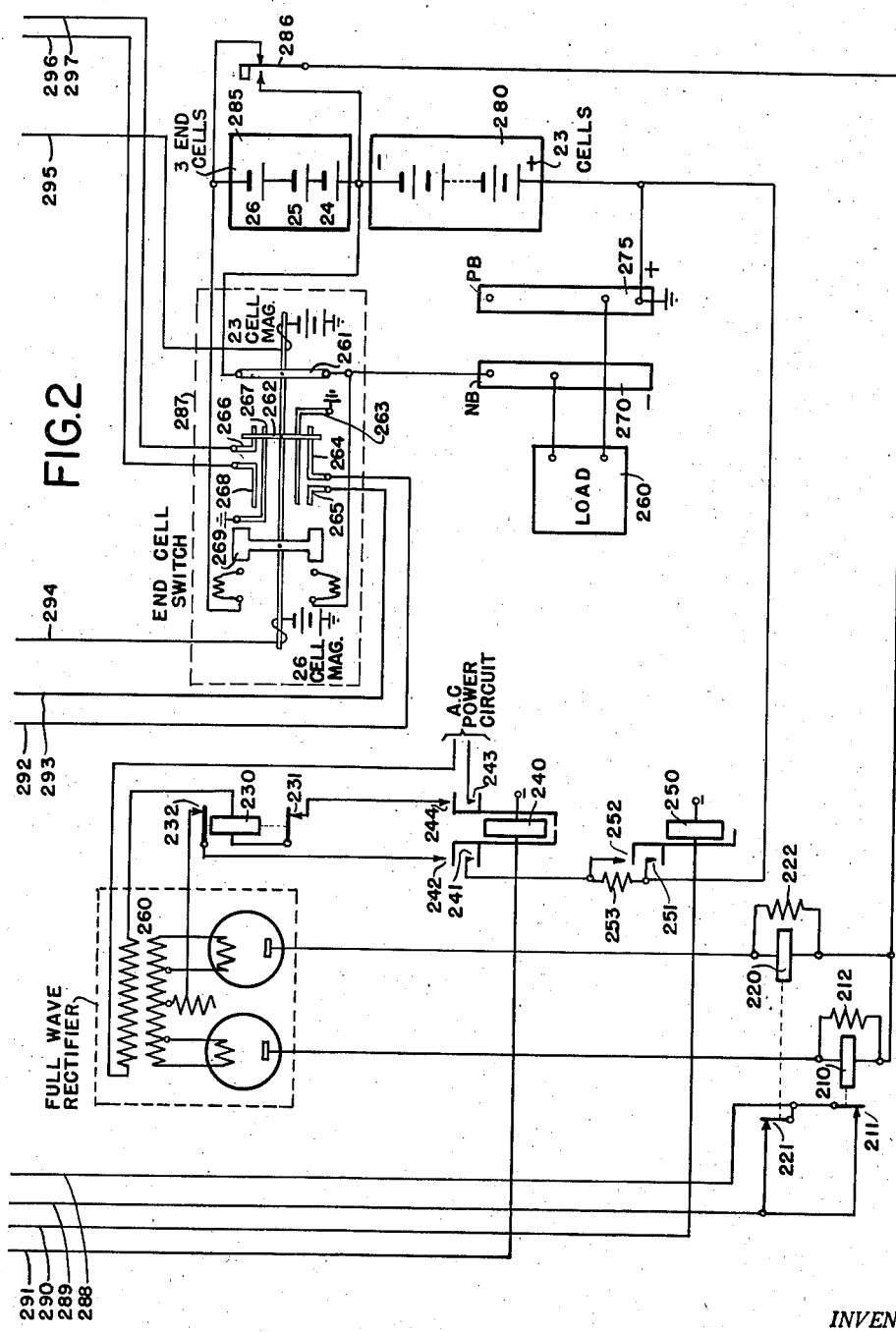

2,398,845

UNITED STATES PATENT OFFICE 2,398,845

BATTERY CHARGING AND VOLTAGE REGULATING SYSTEM

Kurt Mullerheim, Chicago, Ill., assignor to Automatic Electric Laboratories, Inc., Chicago, Ill., a corporation of Delaware Application July 1, 1944, Serial No. 543,104

22 Claims. (Cl. 179—77)

The present invention relates in general to automatic battery charging and voltage regulating systems, and more particularly to improvements in current supply systems of the type used in automatic telephone exchanges to supply direct currents to the relays, magnets and other elements of the telephone switching equipment. Such current supply systems generally include a charging unit for converting alternating current from a commercial power source into direct current of the proper voltage, the direct current supply thus obtained being connected to the main power bus bars of the exchange, and to which bus bars a storage battery and the exchange load are also connected in parallel. The battery serves as an emergency supply source to the exchange load in case of charger failure or commercial power failure, supplies current to the load during peaks of traffic when the current demand exceeds the output of the charging unit, and supplies current to the load during other periods when current is not required from the charging source.

An object of the invention is to provide an improved current supply system which includes new and novel means for automatically regulating the charging and the voltage of a storage battery, in order that the voltage at the main power distributing bus bars may be maintained constant or kept within specified high and low limits. The charging may be initiated at either a low rate or a high rate, may be switched from a low rate to a high rate or vice versa, or may be entirely disconnected, all of these changes being automatically controlled in accordance with the voltage of the battery in order that serious overcharge may be avoided.

Another object of the invention is to provide an improved current supply system wherein voltage test equipment automatic in operation and novel in arrangement controls the operation of the charging equipment. The voltage test equipment is not responsive to relatively minor or momentary changes in the voltage of the storage battery which may cause needless and expensive cycling of the charging equipment, but responds faithfully to substantial and sustained changes in the battery voltage.

A further object of the invention is to provide an improved current supply system wherein the charging equipment may consist of a single charger unit with one charging rate, one charger unit with both a low charging rate and a high charging rate, or two charger units so arranged that one charger unit provides a low rate charge and both charger units multiplied together provide a high rate charge, any one of these charging methods incorporating end cells or not as circumstances may require.

Another object of the invention is to provide an improved method for cutting end cells in and out of the discharge circuit of the storage battery wherein the end cells are switched into the discharge circuit at a higher voltage level when a charged failure occurs during a high rate charging period than the low voltage limit used for regularly cutting in the end cells.

In order to accomplish the above described objects, the current supply system includes a storage battery, one or two charger units, power relay or relays for connecting and disconnecting the charger unit or units, voltage test equipment for automatically controlling the operation of the charger relay or relays, a charge rate switching relay under the control of the voltage test equipment for switching from a low rate of charge to a high rate of charge and vice versa, a timer unit for causing the voltage test equipment to test the voltage of the battery periodically preparatory to starting the charging, changing the charging rate or stopping the charging, end cells, an electromagnetic switch for cutting in or cutting out the end cells, and relays under the supervision of the voltage test equipment for controlling the operation of the end cell switch, all suitably interconnected to provide the desired combination of facilities.

A feature of the invention is that the voltage of the system battery is kept within specified high and low limits through the medium of voltage test equipment which automatically tests the battery intermittently for high voltage and continuously for low voltage. Two separate and independent relays are included in the voltage test equipment for testing the voltage of the battery. One of these relays is known as the high-voltage test relay and is switched across the battery at periodic intervals so long as there is a traffic load on the system, for the purpose of causing the charging to start, the rate of charging to change, the cutting off of the charge, and the switching out of the end cells when end cells are employed. The other relay is known as the low-voltage test relay, and is bridged permanently across the battery for the purpose of causing charging at the high rate whenever the voltage of the battery drops to the preset low limit, and also for causing the end cells to be switched into the discharge circuit of the battery when end cells are used. Since the low-voltage test relay is connected across the battery at all times, the battery is protected continuously against discharge below the low voltage limit, as the low-voltage relay will function whether or not there is a traffic load on the system or whether charging is previously in effect at a low rate.

Another feature of the invention is that the low-voltage test relay is fitted with a contact of the snap action type instead of with standard relay contact springs. The circuits controlled by the low-voltage relay are, therefore, closed and opened with the rapidity of power relay contacts, as the contact is retained in either the open or closed position until reversed by snap action. Hence, there can be no creeping or possible vibratory contacts as the relay is gradually energized or deenergized.

A further feature of the invention is that the high-voltage test relay operates at two different high voltage values for causing two separate and independent charge cut-offs. As is well known, in current supply systems employing a high-voltage relay, the relay is usually adjusted to operate at one given high voltage value only and, therefore, performs only one function. In the present invention, however, the high-voltage test relay operates at one high voltage value to cause the cutting off of the high current rate of charge, and then is automatically reset to operate at a higher value for cutting off the low current rate of charge.

There are other objects and features not specifically mentioned, but which will become apparent by a perusal of the following description which, together with the two sheets of drawings, constitutes one embodiment of the invention.

Referring now to the drawings, Fig. 1 shows the relay equipment provided in this current supply system for controlling the charging of the storage battery, for regulating the voltage across the power distributing bus bars, and for switching the end cells in and out of the discharge circuit, when end cells are employed. In order to simplify the explanation of the operation, and also to illustrate the fact that the current supply system may include end cells or not as circumstances dictate, the relay equipment is grouped under two general classifications. The relay equipment shown at the left is titled "Voltage test equipment" and includes the equipment required for controlling the charging of the battery and for regulating the voltage delivered to the power distributing bus bars. The equipment to the right is titled "End cell control equipment" and is concerned directly with controlling the switching of the end cells.

When end cells are not to be employed, the end cell control equipment shown in Fig. 1 may be omitted, and the voltage test equipment will function properly to control charging and bus bar voltage when certain leads shown in Fig. 1 as interconnecting the two relay equipments are shorted together, other interconnecting leads are left disconnected, and certain minor changes are made, such relatively simple modifications being readily apparent to those skilled in the art.

Fig. 2, when placed below Fig. 1, shows the power apparatus common to the relay equipment of Fig. 1. In these drawings at 280 is represented a storage battery of 48 volts, for instance, comprising 23 cells, with which are associated the three end cells 285. The battery, or negative, bus bar of the system from which battery current is distributed is shown at 270, and the ground, or positive, bus bar at 275. The battery bus bar 270 has its connection with the ungrounded terminal of the battery 280 by way of the short-circuiting arm 261 of the end cell solenoid switch 287. When the end cells 285 have been connected in series with the battery 280, the battery bus bar 270 connection to the ungrounded terminal of the battery 280 is made via the short-circuiting arm 269 of the solenoid switch 287. Should end cells not be employed, the end cell solenoid switch 287 and the end cell charging switch 286 may be omitted, and the battery bus bar 270 is then connected directly to the ungrounded terminal of battery 280. A load 260 is shown bridged across the distributing bus bars 270 and 275. It should be understood that the load 260 is comprised of a large number of relay and magnet windings, lamps and other elements, but for convenience of explanation these elements may be lumped together and considered as a load of variable resistance.

At the upper left of Fig. 2 is shown a rectifier 260 of the full-wave thermionic type, and below the rectifier are shown power switching and supervisory relays associated with the battery charging circuit. It should be understood, however, that the charging equipment may consist of any well-known type, and also that two chargers arranged to be operated in multiple may be employed.

While in the drawings Fig. 1 and Fig. 2 a plurality of battery connections are shown, it should be understood that they are preferably the same battery. Also, in order to simplify the drawings further, use has been made of basic conventions, and such well-known associated power appliances as power panels, main power switches, fuses and supervisory equipment have been omitted.

The invention having been described generally, a detailed operation of the equipment will now be given. For this purpose it will be assumed that the battery 280 is carrying the load 260 and that the voltage of the battery is within the prescribed low and high voltage limits. With this condition of operation, the equipment is in the position shown in the drawings.

In order that the detailed operation may be readily understood, the following two tables indicate the conditions under which the high voltage test relay 20 and the low voltage test relay 70 will function respectively.

High voltage test relay 20

Operate on 46 volts in series with resistances 17 and 18.

Operate on 52 volts in series with resistances 17, 18 and part of 37.

Operate on 53 volts in series with resistances 17, 18 and a larger part of resistance 37.

It should be noted that resistance 37 is fitted with two adjustable taps to obtain the 52 and 53 volt settings.

Low voltage test relay 70

Release on 44 volts in series with resistances 73 and 74, and resistance 75 in multiple with resistance 73.

Release on 46 volts in series with resistances 73 and 74.

Release on 48 volts in series with resistances 73 and 74, and resistance 177 in multiple with the coils of relay 70 and resistance 73 in series.

It should be noted that resistances 73, 75 and 177 are fitted with adjustable taps to secure the voltage settings.

*Periodic test for low voltage*

So long as there is a call going through the exchange, the timer 31, which may be of any well-known type, will be in operation alternately grounding the time 1 and time 2 leads momentarily, as, for example, every 15 seconds. Thus, both time leads 1 and 2 will be grounded at 30 second intervals spaced 15 seconds apart. If, on the other hand, there is no traffic in the exchange, the timer 31 will not operate and, consequently, the two time leads will not be alternately grounded. This arrangement provides for the periodic testing of the battery voltage, dependent upon whether or not calls are being made in the exchange.

Assuming there is traffic in the exchange, relay 30 operates each time the time lead 1 is grounded and locks to the circuit formed from positive battery, contacts 43, 11, 32, second winding of relay 30 to negative battery. The locking of relay 30 closes the circuit of relay 40 from positive battery, contact 35, contact 14, relay 40 to negative battery, and closes the circuit of relay 20 from positive battery, contacts 35, 46, 87, 63, 147, relay 20, resistances 17 and 18 in series to negative battery. Relay 40 is slow to operate and, therefore, the circuit to relay 20 is maintained for an interval at contact 46.

If, under the conditions cited in the preceding paragraph, the voltage of the battery remains above 46 volts, relay 20 will operate and close the circuit of relay 10. The operation of relay 10 short-circuits resistance 17 at contact 16 to insure relay 20 remaining operated: opens the locking circuit of relay 30 at contact 11; and opens the circuit of relay 40 at contact 14, thereby preventing the operation of relay 40. Relay 30 restores and opens the circuit of relay 20 at contact 35. Relay 20 restores and opens the circuit to relay 10. Relay 10 restores and removes the short circuit from resistaice 17.

Relays 30, 20 and 10 cycle as described above every 30 seconds so long as there is traffic in the exchange and the battery voltage remains above 46 volts.

*Low current rate charge*

In time, as discharge of current from battery 280 takes place, the voltage across the battery will drop to the low limit of 46 volts. When this occurs at an interval that time lead 1 is grounded, relay 20 will not operate responsive to its circuit being closed by relay 30, and relay 10, therefore, cannot operate to open the circuit to relay 40 at contact 14. Relay 40, therefore, operates after a short delay and locks to positive battery through contacts 14 and 45.

The operation of relay 40 unlocks relay 30 at contact 43 causing relay 30 to restore: opens the circuit of relay 20 at contact 46: closes the circuit of power relay 240 from positive battery, contact 44, conductor 291, relay 240 to negative battery: connects the time 2 lead through contacts 42 and 51 to relay 50: closes the circuit of relay 190 from positive battery, contact 41, conductor 288, contacts 211 and 221 in multiple, conductor 289, contact 141, relay 190 to negative battery; and adjusts the resistance of the circuit of relay 20 so that relay 20 will not operate when its circuit is again closed unless the battery voltage has increased to 52 volts. The restoration of relay 30 closes the circuit of relay 20 at contact 36 but, as stated in the preceding sentence, relay 20 will not respond until the battery voltage has increased to 52 volts.

The operation of power relay 240 connects the alternating current power circuit to the rectifier 260 at contacts 243, 244 and 231, and also extends the positive charge lead from the rectifier 260 to the positive terminal of the battery 280 through contact 232, 242 and 241. Direct current at the low current rate because of the resistance 253 in the positive lead now charges the battery, and supervisory relays 210 and 220 in the negative charge leads are operated so long as the charging current maintains. Relays 210 and 220 are shunted respectively by resistances 212 and 222 to permit by-passing most of the charging current around the two relays. The operation of relays 210 and 220 opens the circuit of relay 190 at contacts 211 and 221; and the non-operation of relay 190 maintains the charge alarm circuit, which may be of any well-known type, open at contact 195.

A ground pulse over time lead 2 causes relay 50 to operate through contacts 42 and 51. Relay 50 locks to positive battery through contacts 52 and 44 and is, therefore, under the control of relay 40, and opens the multiple circuit through resistance 75 to the low-voltage test relay 70 at contact 53. The circuit of relay 70 is now adjusted to cause relay 70 to restore should the battery voltage drop below 46 volts.

*High current rate charge*

As explained in the preceding paragraph, the resistance of the circuit of low-voltage test relay 70 has been adjusted to cause relay 70 to restore if the low current rate charge is not sufficient to maintain the battery voltage above 46 volts. The restoration of relay 70 is controlled solely by voltage drop, the traffic through the exchange having no effect on this function.

The restoration of relay 70 responsive to the voltage dropping below 46 closes the circuit to relay 90 from positive battery, contacts 71, 175, relay 90 to negative battery. The operation of relay 90 closes the circuit of relay 110 through an obvious circuit, relay 110 operating in turn and locking to positive battery through contacts 112 and 93. The locking of relay 110 causes relay 120 to operate from positive battery through contact 111.

The operation of relay 120 closes the circuit of relay 80 from positive battery through contact 122, and relay 80 locks to positive battery through contacts 82 and 12. The locking of relay 80 causes charge rate switching relay 250 to operate from positive battery at contact 81, conductor 290, relay 250 to negative battery and shunt out resistance 253 at contacts 251 and 252, thereby increasing the charging to the high current rate: causes relay 60 to operate from positive battery through contact 81: short-circuits resistances 73 and 74 with positive battery through contacts 126 and 83, thereby causing relay 70 to operate by reason of the voltage through relay 70 being raised by the short-circuiting of resistances 73 and 74: shunts out a portion of resistance 37 at contact 88 to adjust the circuit of relay 20 to cause the operation of relay 20 at 52 volts when the circuit of relay 20 is closed; and closes the circuit of relay 20 from positive battery, contact 36, part of resistance 37, contacts 88, 47, 86, 147, relay 20, and resistances 17 and 18 in series to negative battery. The operation of relay 60, which is slow to release, places a multiple holding ground on relay 40 to insure relay 40 remaining locked up.

The operation of the low-voltage test relay 70, as described in the preceding paragraph, opens the circuit to relay 90, causing relay 90 to restore. Relay 90 is fitted with a weighted spring which is set in vibration when the relay restores, the weighted spring gradually coming to a stationary position. As the weighted spring vibrates, ground pulses are sent to the slow-to-release relay 110, these pulses becoming slower and slower and finally subside as the weighted spring comes to rest. The purpose of holding relay 110 in the operated position temporarily is to allow the high current charging to raise the voltage of battery 280. When the vibrating spring of relay 90 comes to rest, the circuit of relay 120 is opened.

The restoration of relay 120 removes the ground shunt to resistances 73 and 74 at contact 126, and causes relay 130 to operate from positive battery, contacts 12, 82, 123, relay 130 to negative battery. Relay 130 locks to positive battery through contacts 134, 82 and 12. The locking of relay 130 connects positive battery through contact members 267 and 266 short-circuited by member 262 of end cell switch 287, conductor 297, contacts 136, 194, 84 to resistance 75, thereby adjusting the circuit of relay 70 to cause relay 70 to restore should the battery voltage drop to 44 volts.

Mounted adjacent to the low-voltage test relay 70 and connected in series with the coil windings of the relay is a negative temperature coefficient resistor 72 for the purpose of compensating for changes in the ambient temperature of relay 70 and thus prevent improper operation of the relay. As is well known, this type of resistor has the property of changing its resistance inversely as the temperature changes, i. e., as the temperature drops, the resistance is increased, and vice versa. Hence, because of the fact that the resistor is connected in series with the windings of relay 70, a decrease in the resistance of the relay due to drop in the ambient temperature is compensated for by a corresponding increase in the resistance of resistor 72 and, therefore, relay 70 will function at the predetermined low voltage value to establish the high current rate of charging instead of waiting to function at a still lower voltage value. The battery 280 is thus protected against discharge below the low voltage limit when the ambient temperature is relaitvely low.

*End cell cut in*

If the voltage of battery 280 should drop to 44 volts with charging at the high current rate, relay 70 will restore and cause relay 90 to operate from positive battery, contacts 71, 175, relay 90 to negative battery. The operation of relay 90 closes the circuit of relay 110 through an obvious circuit, relay 110 operating in turn and locking to positive battery through contacts 112 and 93. The locking of relay 110 causes relay 120 to operate from positive battery through contact 111, and relay 120 locks from positive battery, contact members 263 and 264 short-circuited by member 262 of end cell switch 287, conductor 292, contact 131, contact 121, second winding of relay 120 to negative battery.

The locking of relay 120 causes relay 150 to operate from positive battery, contact members 263 and 264 short-circuited by member 262 of end cell switch 287, conductor 292, contacts 131, 121, 132, relay 150 to negative battery; short-circuits resistances 73 and 74 with positive battery through contacts 126 and 83, thereby causing relay 70 to operate; and connects positive battery to the end cell supervisory circuit, which may be of any well-known type, through contacts 164, 135 and 124.

The operation of relay 70 opens the circuit to relay 90 at contact 71 which in turn restores and sets its weighted spring in vibration, sending ground pulses to relay 110. The operation of relay 150 closes the circuit of the 26 cell magnet of end cell switch 287 over conductor 294, causing the end cell switch to move its short-circuiting members 261, 262 and 269 to the left.

Member 261 disconnects the ungrounded terminal of battery 280 from negative bus bar 270, and member 269 connects bus bar 270 to the negative terminal of end cell #26, thus connecting the three end cells 285 in series with battery 280 and boosting the battery voltage by the voltage of the end cells.

The shifting of member 262 to the left removes the holding ground from relay 120, the operating ground from relay 150, disconnects ground from resistance 75, and closes the circuit of relay 170 from ground, members 263 and 265 shorted by member 262, conductor 293, contact 142, relay 170 to negative battery. Relay 170 operates and locks to positive battery through contact 171, conductor 293, and members 265, 262 and 263.

The locking of relay 170 causes relay 160 to operate through contact 172, and connects resistance 177 through contact 176 and resistance 73 in parallel with relay 70. The 177 resistance in parallel with relay 70 adjusts the circuit of relay 70 after relay 120 releases to cause relay 70 to restore should the battery voltage drop to 48 volts with the end cells 285 in series with battery 280. The operation of relay 160 opens the end cell supervisory circuit at contact 164, closes a multiple locking circuit for relay 130 through contacts 162 and 133, and closes a multiple locking circuit for relay 80 through contacts 162, 133 and 134.

The restoration of relay 150, which is slow to release and does not restore until the end cell switch 287 has completed its shift to the left, opens the circuit of the 26 cell magnet at contact 151. The end cell switch 287, therefore, remains in the shifted position until the 23 cell magnet is operated later.

Relay 110 restores as a result of the weighted spring of relay 90 coming to rest, and opens the operating circuit of relay 120 at contact 111. The restoration of relay 120 completes the adjustment of the circuit of relay 70 for causing relay 70 to restore should the voltage of the combined battery and end cells drop to 48 volts. The restoration of relay 70 as a result of the voltage dropping to 48 volts would cause the closing of the low-voltage alarm circuit, which may be of any well-known type, through contacts 71 and 174.

*End cell cut off*

The end cells 285 will remain connected in series with battery 280 until charging at the high current rate raises the voltage across battery 280 to 52 volts. Assuming there is traffic in the exchange, the high-voltage test relay 20 is switched across battery 280 at 30 second intervals, in the manner described in the first two paragraphs in the section titled "Periodic test for low voltage."

When the voltage of battery 280 reaches 52 volts, relay 20 operates and closes the circuit of relay 10. The operation of relay 10 causes relay 140 to operate from positive battery, contacts 13, 125, 165, 193, relay 140 to negative battery, relay 140 locking to positive battery through contacts 146, 166, conductor 296, members 268, 262 and 267 of end cell switch 287 to positive battery.

The locking of relay 140 opens the circuit of relay 20 at contact 147, causing relay 20 to restore and open the circuit of relay 10: closes the end cell supervisory circuit from positive battery through contacts 163 and 144: closes a multiple circuit to relay 170 at contact 143; and causes relay 180 to operate from positive battery, members 267, 262 and 268 of end cell switch 287, conductor 296, contacts 166, 146, 145, relay 180 to negative battery.

The operation of relay 180 closes a circuit to relay 140 at contact 182: connects positive battery through contacts 183 and 83 to relay 70 ahead of resistance 73, causing relay 70 to remain operated; and closes the circuit of the magnet 23 of end cell switch 287 through contact 181 over conductor 295, causing the end cell switch to move its short-circuiting members 261, 262 and 269 to the right.

Member 269 disconnects the end cells 285 from negative bus bar 270, and member 261 connects the ungrounded terminal of battery 280 to bus bar 270, thus removing the end cells 285 from battery 280 and reducing the battery voltage by the voltage of the end cells.

The shifting of member 262 to the right opens the circuit to relay 180 and one winding of relay 140 at member 268; and connects resistance 75 in parallel with resistance 73 from positive battery, members 267, 262 and 266, conductor 297, contacts 136, 194 and 84.

The restoration of relay 180, which is slow to release and does not restore until the end cell switch 287 has completed its shift to the right, opens the circuit of the 23 cell magnet at contact 181: opens the circuit to a winding of relay 140 at contact 182, thus causing the release of relay 140 since the circuit of the other winding of relay 140 is already open at member 268 of the end cell switch; and removes positive battery from relay 70.

The restoration of relay 140 opens the end cell supervisory circuit at contact 144; and opens the circuit of relay 170 at contact 143, thus causing relay 170 to restore since the multiple locking circuit to relay 170 is already open at member 265 of the end cell switch.

The restoration of relay 170 opens the circuit to relay 160 at contact 173; and removes resistance 177 from the circuit of relay 70, thus adjusting the circuit of relay 70 to cause relay 70 to restore and cause the end cells 285 to be again connected in series with battery 280 should the voltage across battery 280 drop to 44 volts.

*High current rate charge cut off*

Assuming that the voltage of battery 280 does not drop to 44 volts after the end cells have been cut off as described in the preceding section titled "End cell cut off," the voltage will in time again rise to 52 volts. The circuit of relay 20 has been previously adjusted to cause relay 20 to operate when the voltage of battery 280 reaches 52 volts.

Now assuming there is traffic in the exchange, the high-voltage test relay 20 is switched across battery 280 at 30 second intervals, in the manner described in the first two paragraphs in the section titled "Periodic test for low voltage." When the voltage of battery 280 reaches 52 volts, relay 20 operates and closes the circuit of relay 10. The operation of relay 10 opens the locking circuits of relays 80 and 130 at contact 12: opens a multiple circuit to relay 40 at contact 14; and closes a multiple circuit to relay 20 at contact 15.

Relay 80 restores and opens the circuit of relay 20 at contact 86: removes the short circuit around part of resistance 37 at contact 83 thereby adjusting the circuit of relay 20 to cause relay 20 to operate when the voltage of battery 280 reaches 53 volts: removes resistor 75 from the circuit of relay 70 thereby adjusting the circuit of relay 70 to cause relay 70 to restore should the battery voltage drop to 46 volts; opens the circuit to relay 60 at contact 81; and opens the circuit to power rate changing relay 250 at contact 81 thereby causing relay 250 to restore and reduce the current charging rate by removing the short circuit from resistance 253 at contacts 251 and 252.

Relay 60 is slow to release and, therefore, maintains the circuit to relay 40 at contact 61 sufficiently long to permit relay 10 to restore and close the multiple circuit to relay 40 at contact 14 before contact 61 opens. The restoration of relay 60 also closes a circuit for relay 20 at contact 63.

The restoration of relay 20 opened the circuit to relay 10 at contact 21 and caused relay 10 to restore. Relay 10 is fast acting in releasing and, as stated in the preceding paragraph, establishes a holding circuit to relay 40 at contact 14 before relay 40 has sufficient time to restore.

As a result of relay 40 remaining in the operated position, relay 50 remains locked to positive battery at contact 44 and prevents the closure of the circuit to resistance 75 at contact 53. The circuit of relay 70, therefore, remains adjusted to cause relay 70 to restore whenever the battery voltage drops to 46 volts.

*Low current rate charge cut off*

Assuming that the voltage of battery 280 does not drop to 46 volts after the charging has been reduced to the low current rate as described in the preceding section titled "High current rate charge cut off," the voltage in time will rise to 53 volts. The circuit of relay 20 has been previously adjusted to cause relay 20 to operate when the voltage of battery 280 reaches 53 volts.

Now assuming there is traffic in the exchange, the high-voltage test relay 20 is switched across battery 280 at 30 second intervals, in the manner described in the first two paragraphs in the section titled "Periodic test for low voltage". In this instance, however, the circuit to relay 20 is opened at contact 36 when relay 30 operates momentarily, thus preventing the possibility of relay 20 operating prematurely. When the voltage of battery 280 reaches 53 volts, relay 20 operates and closes the circuit to relay 10. The operation of relay 10 opens the circuit to relay 40 at contact 14, thereby causing relay 40 to restore; and closes a multiple circuit to relay 20 at contact 15 so that relay 30 will not open the circuit to relay 20.

The restoration of relay 40 disconnects power relay 240 at contact 44, thereby causing relay 240 to restore and open the charging circuit at contacts 243 and 244 for the primary side and contacts 241 and 242 for the secondary side: opens the circuit to relay 20 at contact 47: opens the locking circuit to relay 50 at contact 44: disconnects the time 2 lead from relay 50 at contact 42; and opens the circuit to relay 190 at contact 41, thereby preventing the operation of relay 190 when relays 210 and 220 restore for lack of charging current. The charge alarm supervisory circuit is thus retained in the open position at contact 195.

The lack of charging current through relays 210 and 220 closes contacts 211 and 221 but, as explained in the preceding paragraph, the circuit to relay 190 is open at contact 41.

The restoration of relay 50 connects positive battery to resistance 75 through contacts 53 and 85, thereby adjusting the circuit of low-voltage test relay 70 to cause relay 70 to restore should the battery voltage drop to 44 volts. The restoration of relay 20 opens the circuit to relay 10 at contact 21 and relay 10 restores.

The battery charging and voltage regulating circuit is now at normal with the end cells disconnected and no charging. The next cycle of operation is started as explained in the section titled "Periodic test for low voltage."

*General features*

The end cells 285 may be charged along with the battery by operating the hand-controlled end cell switch 286 so as to connect the end cells in the negative charge leads in series with battery 280. This feature is independent of the automatic end cell control, and the end cells may be charged whether they are connected to the negative bus bar 270 or not.

Condensers 33 and 95 are connected in series respectively with resistances 34 and 96 to prevent excessive sparking at contacts 44 and 81 when the circuits to the power relay 240 and the charging rate switching relay 250 are opened.

Condensers 152 and 184 are connected in series respectively with resistances 153 and 185 to prevent excessive sparking at contacts 151 and 181 when the circuits to the end cell magnets are opened.

A flash over relay 230 is associated with the tube-type charger 260. In case a tube fails and causes an abnormally high current to flow in the alternating current power circuit, relay 230 will operate to open the power circuit at contact 231, and the positive charging lead at contact 232. Either supervisory relay 210 or 220 or both will restore because of lack of charging current and close the circuit to relay 190 at contacts 211 and/or 221, and the operation of relay 190 will close the charge alarm supervisory circuit at contact 195.

Having described the invention and what is considered new and desired to be protected by Letters Patent is set forth in the following claims.

What is claimed is:

1. In a battery charging system, a storage battery, charging means, means in bridge of said battery and responsive at all times to the dropping of the voltage across said battery to a predetermined value for causing said charging means to charge said battery, an electromagnetic voltage testing device, means for bridging said device across said battery at periodic intervals, and means responsive to the operation of said device by reason of the voltage across said battery rising to a predetermined value for disconnecting said charging means from said battery.

2. In a battery charging system, a storage battery, a charging circuit for said battery, means permanently in bridge of said battery and responsive to the dropping of the voltage across said battery to a predetermined value for controlling said charging circuit to cause the charging of said battery, an electromagnetic voltage testing device, a timing element operative continuously for generating electrical pulses at uniformly spaced intervals, means responsive to the pulses from said timing element for switching said device across said battery at said spaced intervals, and means responsive to the operation of said device by reason of the voltage of said battery rising to a predetermined value for opening said charging circuit.

3. In a battery charging system, a storage battery, a charging circuit for said battery including means for charging at different current values, means permanently in bridge of said battery and responsive to the decreasing of the voltage across said battery to a predetermined value for controlling said charging circuit to cause the charging of said battery at the highest current rate, an electromagnetic voltage testing device, means operative periodically for switching said device across said battery, said device arranged to operate in response to the voltage across said battery rising to a predetermined value, and means controlled by said device for reducing the rate of charging current.

4. In a battery charging system, a storage battery, charging means, an electromagnetic voltage testing device, switching means operative at periodic intervals for bridging said device across said battery to test the battery voltage at said intervals, said switching means including an operating circuit for said device normally arranged to prevent the operation of said device when the voltage across said battery tests below a predetermined value, and means operated in the event of the non-operation of said device during a testing period by reason of the voltage across said battery decreasing below said predetermined value for causing said charging means to charge said battery, and for re-arranging said operating circuit to prevent said device operating during a subsequent testing period unless the voltage across said battery rises to a predetermined high limit value, the operation of said device responsive to the rising of the voltage across said battery to the said predetermined high limit value causing said charging means to be disconnected.

5. In a battery charging system, a storage battery, means for charging said battery at different current values, two electromagnetic voltage testing devices, one of said devices permanently bridged across said battery and arranged to operate in response to the voltage across said battery decreasing to a predetermined low value for causing said charging means to charge said battery at the highest current rate, means operative periodically for generating electrical pulses, means responsive to said pulses for switching the said second device in bridge of said battery, said second device arranged to operate in response to the voltage across said battery rising to a predetermined value, and means controlled by said second device for reducing the charging current to a lower value or for disconnecting said charging means.

6. In a current supply system subject to variable load current demands, a storage battery, means for charging said battery at a low current rate or a high current rate, two electromagnetic voltage testing devices, means operative at periodic intervals for connecting the first of said devices in bridge of said battery at said intervals to test the voltage of said battery, means controlled by said first device by reason of the voltage across said battery being below a predetermined low value during a testing period for causing said charging means to charge said battery at the low current rate, a closed circuit permanently bridging said second device across said battery to test continuously for low voltage, said second device arranged to operate responsive to the decreasing of the voltage of said battery below said low value because of a heavy load current demand, and means controlled by said second device for increasing the charging to the said high current rate.

7. In a current supply system, a storage battery, means for charging said battery at a low current rate or a high current rate, two electromagnetic voltage testing devices, means operative at periodic intervals for connecting the first of said devices in bridge of said battery at said intervals, means controlled by said first device by reason of the voltage across said battery decreasing to a predetermined low value for causing said charging means to charge said battery at the low current rate, means for resetting said first device to operate in a subsequent test period after said low current charging has been established providing the voltage across said battery rises to a predetermined high limit value, a closed circuit permanently bridging said second device across said battery, said second device arranged to operate responsive to the decreasing of the voltage of said battery below said low value, and means controlled by said second device for increasing the charging to the said high current rate, the operation of said first device responsive to the rising of the voltage of said battery to the said high limit value causing said charging means to be disconnected.

8. In a current supply system, a storage battery, means for charging said battery at a low current rate or a high current rate, two electromagnetic voltage testing devices, means operative at periodic intervals for connecting the first of said devices across said battery at said intervals, means controlled by said first device by reason of the voltage of said battery decreasing to a predetermined low value for causing said charging means to charge said battery at the low current rate, means for resetting said first device to operate in a subsequent test period after said low current charging has been established providing the voltage of said battery rises to a predetermined high value, a closed circuit permanently bridging said second device across said battery, said second device arranged to operate responsive to the decreasing of the voltage of said battery below said low value, means controlled by said second device for increasing the charging to the said high current rate, the operation of said first device responsive to the rising of the voltage across said battery to the said high value causing the charging to be reduced to the said low current rate, and means for resetting said first device to operate in a subsequent test period after said low current charging has been re-established providing the voltage of said battery rises to a high limit value greater than said high value, the re-operation of said first device responsive to the rising of the voltage across said battery to the said high limit value causing the disconnection of said charging means.

9. In a current supply system, a storage battery, means for charging said battery at a low current rate or a high current rate, two electromagnetic voltage testing devices, means operative at periodic intervals for connecting the first of said devices in bridge of said battery at said intervals, a closed circuit permanently bridging said second device across said battery, said second device arranged to be continuously operated so long as the voltage of said battery remains above a predetermined low value, means controlled by said first device by reason of the voltage across said battery decreasing to said low value for causing said charging means to charge at the said low current rate, the voltage decrease to said low value also causing said second device to restore, means responsive to the restoration of said second device for changing said circuit to cause said second device to re-operate, and for resetting said second device to restore again if the voltage of said battery decreases below said low value for increasing the charging to the said high current rate, and means for resetting said first device to operate in a subsequent test period providing the voltage across said battery rises to a predetermined high value, the operation of said first device responsive to the rising of the voltage of said battery to said high value causing said charging means to be disconnected.

10. In a current supply battery, a storage battery, means for charging said battery at different current rates, an electromagnetic voltage testing device, a closed circuit permanently bridging said device across said battery, said device arranged to be continuously operated so long as the voltage across said battery remains above a predetermined low value, means responsive to the restoration of said device by reason of the voltage across said battery dropping below said low value for causing said charging means to charge at the highest current rate, for causing said device to reoperate, and for resetting said device to restore again if the voltage of said battery decreases again below said low rate, the second restoration of said device responsive to the voltage of said battery again decreasing below said low rate causing a low voltage alarm circuit to be operated.

11. In combination, a source of electric power, an electromagnetic device, a circuit connecting said device to said source, said circuit including resistance of such value to cause the operation of said device at a predetermined voltage value and the restoration of said device responsive to the decreasing of the voltage to a predetermined low value, a separate resistance, and means for connecting said separate resistance in multiple with said resistance included in said circuit, said separate resistance of such value that the voltage supplied to said device by reason of the two said resistances being connected in multiple is sufficiently increased to cause said device to re-operate.

12. In combination, a source of electric power, two electromagnetic devices, one of said devices connected in bridge of said source and arranged to be operated continuously so long as the voltage across said source remains above a predetermined low value, and means connecting said second device across said source at periodic intervals, said second device arranged to operate during said intervals only in the event that the voltage across said source remains above said low value.

13. In combination, a storage battery, means for charging said battery at either a low current rate or a high current rate, two electromagnetic devices, the first of said devices controlling the said low current rate charging and the said second device controlling the said high current rate charging, means controlled by said first device effective in the event the voltage of said battery decreases to a predetermined low value for causing said charging means to charge said battery at said low current rate, said second device ineffective to cause said charging to be increased to the said high current rate so long as the voltage across said battery does not drop below said low value, and means for resetting said first device to cause the disconnection of said charging means responsive to the rising of the voltage across said battery to a predetermined high value.

14. In a telephone system, a storage battery, a discharge circuit therefor, subscribers' lines, means including said discharge circuit for completing connections between said lines, charging means, means in bridge of said battery and responsive at all times to the dropping of the voltage across said battery to a predetermined value for causing said charging means to charge said battery, an electromagnetic voltage testing device, means for switching said device across said battery at periodic intervals only so long as there are connections between said lines, and means responsive to the operation of said device by reason of the voltage of said battery rising to a predetermined value for disconnecting said charging means.

15. In a telephone system, a storage battery, a discharge circuit therefor, subscribers' lines, means including said discharge circuit for completing connections between said lines, a charging circuit for said battery including means for charging at different current values, means responsive to the decreasing of the voltage across said battery to a predetermined value for controlling said charging circuit to cause the charging of said battery at the highest current rate, an electromagnetic voltage testing device, means for switching said device across said discharge circuit at periodic intervals only so long as there are connections between said lines, said device arranged to operate in response to the voltage across said battery rising to a predetermined value, and means controlled by said device for reducing the charging current to a lower value or for opening said discharge circuit.

16. In a telephone system, subscribers' lines, means for establishing connections between said lines, a storage battery, an electromagnetic voltage testing device, and means operating at periodic intervals by reason of one or more connections existing or being established between said lines for switching said device across said battery to test the voltage of said battery at said intervals.

17. In a telephone system, subscribers' lines, means for completing connections between said lines, a storage battery, charging means, an electromagnetic voltage testing device, switching means operating at periodic intervals by reason of one or more connections existing or being established between said lines for bridging said device across said battery at said intervals to test the voltage of said battery, an operating circuit for said device included in said switching means normally arranged to prevent the operation of said device when the voltage across said battery tests below a predetermined value, means operating in the event of the non-operation of said device during a testing period by reason of the voltage across said battery decreasing below said predetermined value for causing said charging means to charge said battery and for re-arranging said circuit to prevent said device operating during a subsequent testing period unless the voltage of said battery rises to a predetermined high limit value, the operation of said device in a testing period responsive to the voltage across said battery rising to the said predetermined high limit value causing said charging means to be disconnected from said battery.

18. In a telephone system, subscribers' lines, means for completing connections between said lines, a storage battery, means for charging said battery, two electromagnetic voltage testing devices, one of said devices permanently bridged across said battery and responsive to the decreasing of the voltage across said battery to a predetermined low limit value for causing said charging means to start charging said battery, means operating periodically by reason of one or more connections existing or being established between said lines for generating electrical pulses, means responsive to said pulses for switching said second device across said battery to test the voltage across said battery at said intervals, said second device arranged to operate in response to the voltage across said battery rising to a predetermined high limit value, and means controlled by said second device for disconnecting said charging means from said battery.

19. In a current supply system, a storage battery, charging means, end cells, switching means in bridge of said battery and responsive to the decreasing of the voltage across said battery to a predetermined low value for causing said charging means to charge said battery, means for resetting said switching means after the voltage across said battery has decreased to said low value to cause the switching of said end cells in series with said battery should the voltage across said battery drop below said low value, said switching means responsive to the decreasing of the voltage across said battery below said low value subsequent to the establishment of said charging causing said end cells to be switched in series with said battery, an electromagnetic voltage testing device, means for bridging said device across said battery at periodic intervals, and means responsive to the operation of said device by reason of the voltage of said combined battery and end cells rising to a predetermined high value for disconnecting said end cells from said battery.

20. In a current supply system, a storage battery, charging means, end cells, switching means in bridge of said battery and responsive to the decreasing of the voltage across said battery to a predetermined low value for causing said charging means to charge said battery, means for resetting said switching means after the voltage across said battery has decreased to said low value to cause the switching of said end cells in series with said battery should the voltage of said battery drop below said low value, said switching means responsive to the decreasing of the voltage across said battery below said low value subsequent to the establishment of said charging causing said end cells to be switched in series with said battery and thereby raise the voltage of said battery by the added voltage of said end cells, and means responsive to the decreasing of the voltage of said combined battery and end cells below a predetermined value for causing a low voltage alarm circuit to be operated.

21. In a current supply system, a storage battery, charging means having a charging position, end cells, means in bridge of said battery and responsive to the decreasing of the voltage across said battery to a predetermined low value for switching said charging means to the charging position, and means operative by reason of the failure of said charging means to supply charging current to said battery for causing the immediate switching of said end cells in series with said battery.

22. In a telephone system, subscribers' lines, means for completing connections between said lines, a storage battery, charging means, end cells, switching means in bridge of said battery and responsive to the decreasing of the voltage across said battery to a predetermined low value for causing said charging means to charge said battery, means for resetting said switching means after the voltage across said battery has decreased to said low value to cause the switching of said end cells in series with said battery should the voltage of said battery drop below said low value, said switching means responsive to the decreasing of the voltage of said battery below said low value subsequent to the establishment of said charging causing said end cells to be switched in series with said battery, an electromagnetic voltage testing device, means for bridging said device across said battery at periodic intervals by reason of one or more connections existing or being established between said lines, and means responsive to the operation of said device by reason of the voltage of said combined battery and end cells rising to a predetermined high value for disconnecting said end cells.

KURT MULLERHEIM.